United States Patent Office 3,817,947
Patented June 18, 1974

3,817,947
POLYSULFIDE POLYMERS WITH INCREASED
RESISTANCE TO SOLVENTS
Eugene R. Bertozzi, Yardley, Pa., assignor to Thiokol
Chemical Corporation, Bristol, Pa.
No Drawing. Filed Jan. 29, 1973, Ser. No. 327,277
Int. Cl. C08g 23/00
U.S. Cl. 260—79.1
22 Claims

ABSTRACT OF THE DISCLOSURE

Polysulfide elastomers and —SH terminated liquid polymers with increased resistance to solvents are prepared by copolymerizing dichloroethylformal and epichlorohydrin in the presence of alkali metal or alkaline earth metal polysulfides. The resultant polymer has diethylene formal units and 2-hydroxypropylene units randomly dispersed but each separated by polysulfide groups from each other. The hydroxyl groups randomly along the polymer chain result in increased resistance to organic solvents while the ethylformal groups provide the normal polysulfide properties.

BACKGROUND OF THE INVENTION

Field of the invention

This invention relates to novel elastomeric polysulfide polymers which have increased resistance to organic solvents compared to previous polysulfide polymers. Copolymerization of epihalohydrin and dichloroethylformal in the presence of alkali metal or alkaline earth metal polysulfides produces a latex dispersion of very high molecular weight which consists of 2-hydroxy propylene units and diethylene formal units linked by polysulfide groups with the units being in a random distribution but each separated by polysulfide groups from each other. This latex may be coagulated to yield an elastomer with excellent solvent resistance or it may be split to produce a polysulfide crude or liquid polysulfide polymers that cure to elastomers also with excellent solvent resistance.

Description of the prior art

It is known to prepare condensation products of monohalogenated derivatives of aliphatic epoxides with alkali metals or alkaline earth metal sulfides or polysulfides. The production of condensates of this kind is disclosed in several patents including U.S. 3,352,837 wherein a sulfur soluble product is obtained.

It is also known to prepare condensation products of dihalogenated compounds such as dichloroethylformal, ethylene dichloride, and 1,2-dichloropropane, with sodium polysulfides. These reactions are illustrated in many patents assigned to Thiokol Chemical Corporation.

However, no reference is known wherein copolymers of epihalohydrins and dichloroethylformal with polysulfides are prepared, particularly wherein an elastomeric product results especially wherein the elastomeric product has increased resistance to organic solvents.

SUMMARY OF THE INVENTION

It is an object of this invention to produced polysulfide elastomers, crude rubbers, and liquid polymers which have increased resistance to organic solvents in comparison with conventional polysulfide polymers.

A further object is to produce copolymers containing 2-hydroxy propylene units and diethylene formal units interconnected by polysulfide groups with the units randomly distributed along the chain.

More particularly, copolymers of 15–85 mole percent 2-hydroxypropylene units and 85–15 mole percent diethylene formal units interconnected by polysulfide groups are produced which are elastomers with improved organic solvent resistance or are split to crude rubbers or to liquid polymers both of which cure to elastomers with improved organic solvent resistance. The copolymers preferably contain 30–70 mole percent 2-hydroxy propylene units and 70–30 mole percent diethylene formal units. The crude rubbers may have molecular weights above about 70,000 and the liquid polymers molecular weights of 500 to 10,000, preferably 1,000 to 6,000.

DESCRIPTION OF THE PREFERRED EMBODIMENTS

The epihalohydrins which may be used as the comonomer units include epichlorohydrin, epibromohydrin, epifluorohydrin, and epiiodohydrin. Epichlorohydrin is the preferred reactant due to its being a commercial product and readily available in large quantities, and so most of products used in the preparation of this invention were prepared from it. The epihalohydrin is used as about 15–85 mole percent of the comonomers.

The dichloroethylformal comonomer is readily available or may be made by a relatively straightforward process of reacting ethylene chlorohydrin and formaldehyde with the continual removal of water to complete the reaction. The dichloroethylformal is used as about 85–15 mole percent of the comonomers.

Additionally, small amounts, i.e. .25–4 mole percent of crosslinking agents may be polymerized with the epihalohydrin units and dichloroethylformal units. Suitable crosslinking agents are halo-organic compounds having three or more halogen groups, such as 1,2,3-trichloropropane.

The novel polysulfide polymers of this invention are prepared by the copolymerization of the epihalohydrin and dichloroethylformal with the polysulfide yielding 2-hydroxy propylene units and diethylene formal units each separated by polysulfide groups from each other, but linked in a random distribution by the polysulfide groups. Sodium polysulfide will be used in this description of the process, but it is to be understood that any alkali metal or alkaline earth metal polysulfide may be substituted therefore. The epoxy end of the epihalohydrin molecule reacts with the aqueous $Na_2S_x$ to form one mol of NaOH per mol of epihalohydrin. Because of this, one mol of NaSH per mol of epihalohydrin is added to the $Na_2S_x$ at the start of the polymerization to convert the NaOH, as it is formed, to $Na_2S$. The total polysulfide used is about 1.3 mols per mol of mixed organic monomer unit reactants. The total polysulfide used is considered to be the $Na_2S$ formed plus the original $Na_2S_x$. The rank $x$ of the $Na_2S_x$ is chosen to give an average rank of about 2.25 when averaged with the $Na_2S$ formed. Thus, for a polymerization of one mol of dichloroethylformal and one mol of epihalohydrin, 1.6 mols of $Na_2S_{3.03}$ would be used because the 1 mol of $Na_2S$ o be formed would total to 2.6 mols of polysulfide of average rank 2.25.

Accordingly, the reaction may be expressed as:

$n\text{CH}_2\!\!-\!\!\text{CH}, \text{CH}_2\text{X} + n\text{ClC}_2\text{H}_4\text{OCH}_2\text{OC}_2\text{H}_4\text{Cl} + n\text{Na}_2\text{S}_x + n\text{NaSH}$

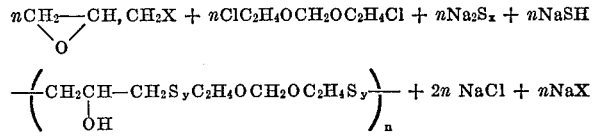

wherein:

$y$ is less than $x$ and at least 2

X is a halogen

The following examples are intended to be merely illustrative of the invention herein, and not in limitation thereof.

EXAMPLE 1

This example shows a procedure for preparing the polymers of this invention using 49.75 mole percent dichloroethylformal, 49.75 mole percent epichlorohydrin, and .5 mole percent 1,2,3-trichloropropane crosslinking agent.

The following ingredients were used in the specified amounts:

| Ingredient | Moles | Amount |
|---|---|---|
| Sodium polysulfide (rank 3.1) | 4.8 | 697.0 g. |
| Sodium sulfhydrate 70% | 2.985 | 238.8 g. |
| Sodium sulfonate (5% solution) | | 39.0 ml. |
| Sodium hydroxide (50% solution) | .62 | 32.2 ml. |
| Magnesium chloride (25% solution) | .31 | 228.0 ml. |
| Dichloroethylformal | 2.985 | 516.4 g. |
| Epichlorohydrin | 2.985 | 276.1 g. |
| 1,2,3-trichloropropane | .03 | 4.4 g. |

The sodium polysulfide was adjusted to an average rank of 3.1 by blending rank 2 and rank 4 polysulfides. The sodium polysulfide was charged to the reactor together with the sodium sulfhydrate, the sodium sulfonate, and the sodium hydroxide, whereupon the reactor was heated to about 200° F. and blanketed with nitrogen. When the reactor temperature reached about 195–200° F., the magnesium chloride solution was added to react with the sodium hydroxide to produce colloidal magnesium hydroxide. The dichloroethylformal, epichlorohydrin, and trichloropropane were mixed and fed to the reactor as a mixture over a 1 hour period while maintaining the temperature at about 200° F. The reactor was then held at about 210° F. for 1 hour. The spent sodium polysulfides were then washed away by repeated dilutions with warm water and the dispersed polymer then coagulated by the addition of acetic acid, filtered on a Büchner funnel, and then oven dried to remove the remaining moisture.

The result was a piece of crude elastomeric polysulfide rubber which, when pieces thereof were placed in aromatic solvents, showed reduced solvent swell in comparison with a like prepared rubber containing no 2-hydroxy propylene units therein.

EXAMPLE 2

This example shows the making and use of a high molecular weight SH-terminated crude polysulfide rubber. The procedure of Example 1 was twice repeated, first with no trichloropropane, and then with 2% trichloropropane, to produce two clean latices. To each clean latex sodium sulfite, sodium bisulfite, and sodium sulfhydrate were added in sufficient quantities to coagulate the latex, provide SH terminals and produce a crude rubber with a molecular weight of about 80,000 to 100,000.

Each of these high molecular weight polysulfide crudes were compounded in a normal manner and the resultant properties compared with a like-compounded ST® polysulfide polymer from Thiokol Chemical Corporation which does not have any 2-hydroxy propylene units in the polymer backbone, but does have 2% crosslinking agent and a molecular weight of about 80,000 to 100,000.

As can be seen from the results in Table I, the physical properties were similar, but the solvent resistance as measured by the volume swell was markedly better for the copolymer after 1 week at room temperature.

TABLE I.—RESULTS OF EXAMPLE 2

| | 1 | 2 | 3 |
|---|---|---|---|
| Ingredient: | | | |
| Thiokol ST® (2% trichloropropane) | 100 | | |
| Copolymer with no trichloropropane | | 100 | |
| Copolymer with 2% trichloropropane | | | 100 |
| Carbon black | 60 | 60 | 60 |
| Stearic acid | 1 | 1 | 1 |
| Zinc peroxide | 5 | 5 | 5 |
| Lime | 1 | 1 | 1 |

The compounds were cured for 30 minutes at 310° F.

| Original physicals: | | | |
|---|---|---|---|
| Tensile, p.s.i. | 1,130 | 1,000 | 830 |
| Elongation, percent | 290 | 420 | 120 |
| 100% modulus, p.s.i. | 430 | 300 | 630 |
| Hardness, Shore A | 72 | 73 | 78 |
| Volume swell, percent: | | | |
| Toluene | 82.0 | 29.5 | 25.6 |
| Methyl ethyl ketone | 54.0 | 59.8 | 47.6 |
| Benzene | 122.2 | 52.1 | 42.0 |
| Ethyl acetate | 45.0 | 38.9 | 31.3 |

EXAMPLE 3

In this example, the latex of Example 1 prepared from 49.75% epichlorohydrin, 49.75% dichloroethylformal, and .5% trichloropropane was split to yield a liquid polysufide polymer with SH terminals and a molecular weight of about 4000.

This is performed by the addition of sodium sulfhydrate, sodium sulfite, and sodium bisulfite in a similar manner to that by which LP® polysulfide polymers are prepared by Thiokol Chemical Corporation and as described by the instant inventor in Rubber Chemistry and Technology, Vol. 41, No. 1, February 1968, pages 124–126, incorporated herein by reference.

This liquid polysulfide copolymer was then compounded and cured using normal polysulfide curing ingredients and procedures. LP®-32 liquid polysulfide polymer of Thiokol Chemical was compounded and cured in a like manner and solvent resistance of the materials were compared. LP®-32 is the equivalent polymer to the new copolymer of this invention but without any 2-hydroxy propylene units. The solvent resistance of the cured compounds was obtained after one week immersion at room temperature in the various solvents. The novel copolymer compound showed better solvent resistance in aromatic solvents than the LP®-32 and the same resistance to water. The formulations and solvent swell results are presented in Table II.

TABLE II.—RESULT OF EXAMPLE 3

| Formulation: | | | |
|---|---|---|---|
| LP®-32 polysulfide polymer | 100 | 100 | |
| Epichlorohydrin-dichloroethylformal polysulfide liquid polymer | | | 100 |
| Carbon black | 30 | 30 | 30 |
| Stearic acid | 1 | 1 | 1 |
| Sulfur | 0.1 | 0.1 | 0.1 |
| Lead dioxide | 7.5 | 15.0 | 15.0 |
| Chlorinated biphenyl plasticizer | 7.5 | 15.0 | 15.0 |
| Original physical properties: | | | |
| Tensile, p.s.i. | 650 | 540 | 655 |
| Elongation, percent | 760 | 680 | 300 |
| 100% modulus, p.s.i. | 176 | 140 | 280 |
| 200% modulus, p.s.i. | 51 | 47 | 59 |
| Volume swell, percent: | | | |
| Ethyl acetate | 25.6 | 33.1 | 16.8 |
| Methyl ethyl ketone | 60.6 | 55.3 | 42.0 |
| Toluene | 114.2 | 101.5 | 16.8 |
| Benzene | 211.9 | 195.5 | 34.9 |
| Xylene | 34.9 | 34.9 | 8.0 |
| Water | 0 | 0 | 0 |

EXAMPLE 4

The procedure of Examples 1 and 3 is repeated using a monomer composition of 49 mole percent dichloroethylformal, 49 mole percent epichlorohydrin, and 2 mole percent trichloropropane. However, instead of sodium polysulfide, sodium sulfhydrate, sodium hydroxide, and the other sodium salts, the corresponding potassium salts are used, i.e. potassium polysulfide, potassium sulfhydrate, potassium hydroxide, etc.

The resultant polysulfide liquid copolymer is compounded, and cured for seven days at room temperature whereupon volume swell measurements are taken and compared with a like processed LP®-2 polysulfide polymer of Thiokol which has a similar molecular weight and crosslinking content, but no epichlorohydrin.

The formulations and volume swell measurements are listed in Table III. As can be seen, the novel copolymer has greatly improved resistance to aromatic solvents, equivalent resistance to acetic acid and water, and poorer resistance to alcohols. The poorer resistance to alcohols would be expected due to the high hydroxyl content, however the good resistance to water is very surprising.

TABLE III.—RESULTS OF EXAMPLE 4

| Formulation: | | | |
|---|---|---|---|
| LP®-2 polysulfide polymer | 100 | 100 | |
| Epichlorohydrin-dichloroethyl-formal liquid copolymer | | | 100 |
| Carbon black | 30 | 30 | 30 |
| Stearic acid | 1 | 1 | 1 |
| Lead dioxide | 7.5 | 12.5 | 12.5 |
| Chlorinated biphenyl plasticizer | 7.5 | 12.5 | 12.5 |
| Volume swell, percent: | | | |
| 10% acetic acid | 16.7 | 12.2 | 12.2 |
| Carbon tetrachloride | 39.7 | 30.2 | 12.2 |
| Ethyl acetate | 39.7 | 30.2 | 25.6 |
| Linseed oil | −3.5 | −3.5 | −3.5 |
| Methyl ethyl ketone | 71.5 | 67.2 | 53.3 |
| Toluene | 101.5 | 10.0 | 21.0 |
| Xylene | 34.9 | 25.6 | 12.2 |
| Water | −0.6 | −1.5 | 0 |
| Diacetone alcohol | 13.1 | 8.0 | 19.4 |
| Butyl carbitol | 14.1 | 9.9 | 24.6 |

EXAMPLE 5

The procedures of Examples 1 and 3 were repeated except varying the monomer feed compositions as shown below. The results showed that when the monomer feed contained 80% epichlorohydrin, the cured liquid polymer had only borderline elastomeric properties, but better solvent resistance. Conversely, when the monomer feed contained 20% epibromohydrin, the improved solvent resistance, though present, was markedly reduced.

Table IV gives the monomer feed compositions by mole percentage, and the amount of sodium polysulfide and sodium sulfhydrate in moles needed for the reaction based upon a total monomer feed of 6.0 moles.

TABLE IV.—FORMULATIONS FOR EXAMPLE 5

| Ingredient | Percent of monomer feed | | | | |
|---|---|---|---|---|---|
| | a | b | c | d | e |
| Epichlorohydrin | 80 | 64 | | | |
| Epibromohydrin | | | 50 | | 20 |
| Epiiodohydrin | | | | 39 | |
| Dichloroethylformal | 19.5 | 33 | 49 | 59 | 78 |
| Trichloropropane | .5 | 3 | 1 | 2 | 2 |
| | Moles of ingredient necessary | | | | |
| Sodium polysulfide: | | | | | |
| Rank 4.22 | 3.02 | | | | |
| Rank 3.48 | | 3.92 | | | |
| Rank 3.10 | | | 4.80 | | |
| Rank 2.80 | | | | 5.40 | |
| Rank 2.48 | | | | | 6.60 |
| Sodium sulfhydrate | 4.78 | 3.88 | 2.99 | 2.40 | 1.20 |

What is claimed is:

1. As a composition of matter, polysulfide copolymers comprising 2-hydroxy propylene units and diethylene formal units randomly dispersed along the main polymer chain with adjacent units being interconnected by polysulfide groups.

2. The copolymers of claim 1 wherein the 2-hydroxy propylene units are present as about 15 to 85 percent of the total units.

3. The copolymers of claim 1 wherein the 2-hydroxy propylene units are present as about 30 to 70 mole percent of the total units.

4. The copolymers of claim 1 having a crosslinking amount of crosslinking units.

5. The copolymers of claim 4 wherein the crosslinking units are present as about 0.25 to 4 mole percent of the total units.

6. The copolymers of claim 4 wherein the crosslinking units are propane units.

7. The copolymers of claim 1 wherein the copolymers are SH-terminated elastomers with a molecular weight above about 70,000.

8. The cured copolymers of claim 7.

9. The copolymers of claim 1 wherein the copolymers are SH-terminated liquid polymers with a molecular weight between about 500 and 10,000.

10. The cured copolymers of claim 9.

11. The copolymers of claim 9 wherein the molecular weight is between about 1,000 and 6,000.

12. The cured copolymers of claim 11.

13. A process for the preparation of polysulfide copolymers which comprises reacting as monomers an epihalohydrin and dichloroethylformal with an alkali metal or alkaline earth metal polysulfide and with an alkali metal or alkaline earth metal sulfhydrate, at temperatures of from about 160° to 210° F., and wherein the sulfhydrate is present in about an equimolar amount of the epihalohydrin.

14. The process of claim 13 wherein the epihalohydrin is selected from the group consisting essentially of epibromohydrin, epichlorohydrin, and epiiodohydrin.

15. The process of claim 13 wherein the epihalohydrin is epichlorohydrin.

16. The process of claim 13 wherein the epihalohydrin is present in about 15 to 85 mole percent of the total monomers.

17. The process of claim 13 wherein the epihalohydrin is present in about 30 to 70 mole percent of the total monomers.

18. The process of claim 13 wherein a crosslinking amount of a crosslinking agent is included as a monomer.

19. The process of claim 18 wherein the crosslinking agent is present as about 0.25 to 4 mole percent of the monomers.

20. The process of claim 18 wherein the crosslinking agent is 1,2,3-trichloropropane.

21. The process of claim 13 wherein the alkali metal or alkaline earth metal polysulfide is sodium polysulfide.

22. The process of claim 13 wherein the alkali metal or alkaline earth metal sulfhydrate is sodium sulfhydrate.

References Cited

UNITED STATES PATENTS

| 2,731,437 | 1/1956 | Bender et al. | 260—79 |
| 2,849,416 | 8/1958 | Bender et al. | 260—79.1 |
| 3,352,837 | 11/1967 | Signouret | 260—79 |

MELVYN I. MARQUIS, Primary Examiner

U.S. Cl. X.R.

260—37 R, 79.1